United States Patent
Mazza'

(10) Patent No.: US 7,134,818 B2
(45) Date of Patent: Nov. 14, 2006

(54) TOOL-HOLDING SYSTEM FOR HIGH-ACCURACY CALIBRATION OF HOLES

(75) Inventor: Franco Mazza', Ospiate Bollate (IT)

(73) Assignee: Sumen Italia S.R.L. (IT)

( * ) Notice: Subject to any disclaimer, the term of this patent is extended or adjusted under 35 U.S.C. 154(b) by 0 days.

(21) Appl. No.: 10/483,841

(22) PCT Filed: Oct. 8, 2002

(86) PCT No.: PCT/IT02/00642

§ 371 (c)(1),
(2), (4) Date: Jun. 21, 2004

(87) PCT Pub. No.: WO03/031118

PCT Pub. Date: Apr. 17, 2003

(65) Prior Publication Data

US 2004/0234351 A1 Nov. 25, 2004

(30) Foreign Application Priority Data

Oct. 9, 2001 (IT) .......................... PR2001A0066

(51) Int. Cl.
*B23Q 11/00* (2006.01)
(52) U.S. Cl. ...................... 409/141; 409/135; 409/136; 409/231; 409/239; 408/56
(58) Field of Classification Search ................ 409/141, 409/135–136, 231, 239; 408/56; *B23C 1/06*
See application file for complete search history.

(56) References Cited

U.S. PATENT DOCUMENTS

| 2,283,240 | A | * | 5/1942 | Trinkle | 409/80 |
|---|---|---|---|---|---|
| 2,404,149 | A | * | 7/1946 | Trinkle | 409/136 |
| 2,603,040 | A | * | 7/1952 | Durkee | 451/135 |
| 3,199,385 | A | * | 8/1965 | Bechler | 82/110 |
| 3,290,966 | A | * | 12/1966 | Gesko | 408/16 |
| 3,374,710 | A | * | 3/1968 | Sattler | 409/141 |
| 3,389,727 | A | * | 6/1968 | Feldpausch | 81/476 |
| 3,443,399 | A | * | 5/1969 | Pope et al. | 464/7 |
| 3,582,226 | A | * | 6/1971 | Shurtliff | 408/143 |
| 3,628,290 | A | * | 12/1971 | Wilson et al. | 464/147 |
| 3,643,546 | A | * | 2/1972 | Richter et al. | 409/141 |
| 3,652,175 | A | * | 3/1972 | Walters et al. | 408/46 |
| 3,670,587 | A | * | 6/1972 | Lemper | 72/239 |
| 3,673,918 | A | * | 7/1972 | Zankl | 409/141 |

(Continued)

FOREIGN PATENT DOCUMENTS

DE 3634734 A1 * 4/1988

(Continued)

*Primary Examiner*—Monica Carter
*Assistant Examiner*—Eric A. Gates
(74) *Attorney, Agent, or Firm*—Shlesinger & Fitzsimmons

(57) ABSTRACT

The invention relates to the field of toolings for high-accuracy finishing through-holes and non-through-holes, such as for example for calibration, lapping operations. More precisely the invention refers to a tool-holding system for high-accuracy calibration of the type comprising a driving shaft (2) and a driven shaft (3) mutually connected by two cardan joints (5) and that provides an external cylindrical body (6) supported through bearings (8) by said driving shaft (2). The cylindrical body or liner (6) is closed on its bottom side by a driving bush oscillating in a plane perpendicular to the driven shaft rotation axis; said oscillations being compensated by elastic means. Axial compensation means for driven shaft movements are also provided. The liner (6) forms a chamber (7) that is kept full of oil.

13 Claims, 2 Drawing Sheets

U.S. PATENT DOCUMENTS

| | | | |
|---|---|---|---|
| 3,747,470 A * | 7/1973 | Inoue et al. | 409/141 |
| 4,094,174 A * | 6/1978 | Okuda et al. | 72/238 |
| 4,248,559 A * | 2/1981 | Deckenback et al. | 409/307 |
| 4,441,352 A * | 4/1984 | McDonagh et al. | 72/249 |
| 4,545,706 A * | 10/1985 | Hiroyasu et al. | 408/1 BD |
| 4,613,000 A * | 9/1986 | Moore | 173/217 |
| 4,645,387 A * | 2/1987 | Rohm | 408/127 |
| 4,831,858 A * | 5/1989 | Yoshizawa et al. | 72/249 |
| 4,836,723 A * | 6/1989 | Flammini | 409/141 |
| 4,901,551 A * | 2/1990 | Widart | 72/58 |
| 5,143,493 A * | 9/1992 | Najima et al. | 409/141 |
| 6,109,842 A * | 8/2000 | Cook | 409/131 |
| 6,280,126 B1 * | 8/2001 | Slocum et al. | 409/141 |
| 6,345,942 B1 * | 2/2002 | Cook | 409/131 |
| 6,382,888 B1 * | 5/2002 | Cook | 409/141 |
| 6,537,000 B1 * | 3/2003 | Weck | 409/141 |
| 2005/0254913 A1 * | 11/2005 | Leon | 409/200 |

FOREIGN PATENT DOCUMENTS

| | | | |
|---|---|---|---|
| DE | 4031986 C1 | * | 5/1991 |
| JP | 02131839 A | * | 5/1990 |
| JP | 2005334990 A | * | 12/2005 |
| RO | 103121 | * | 1/1993 |

\* cited by examiner

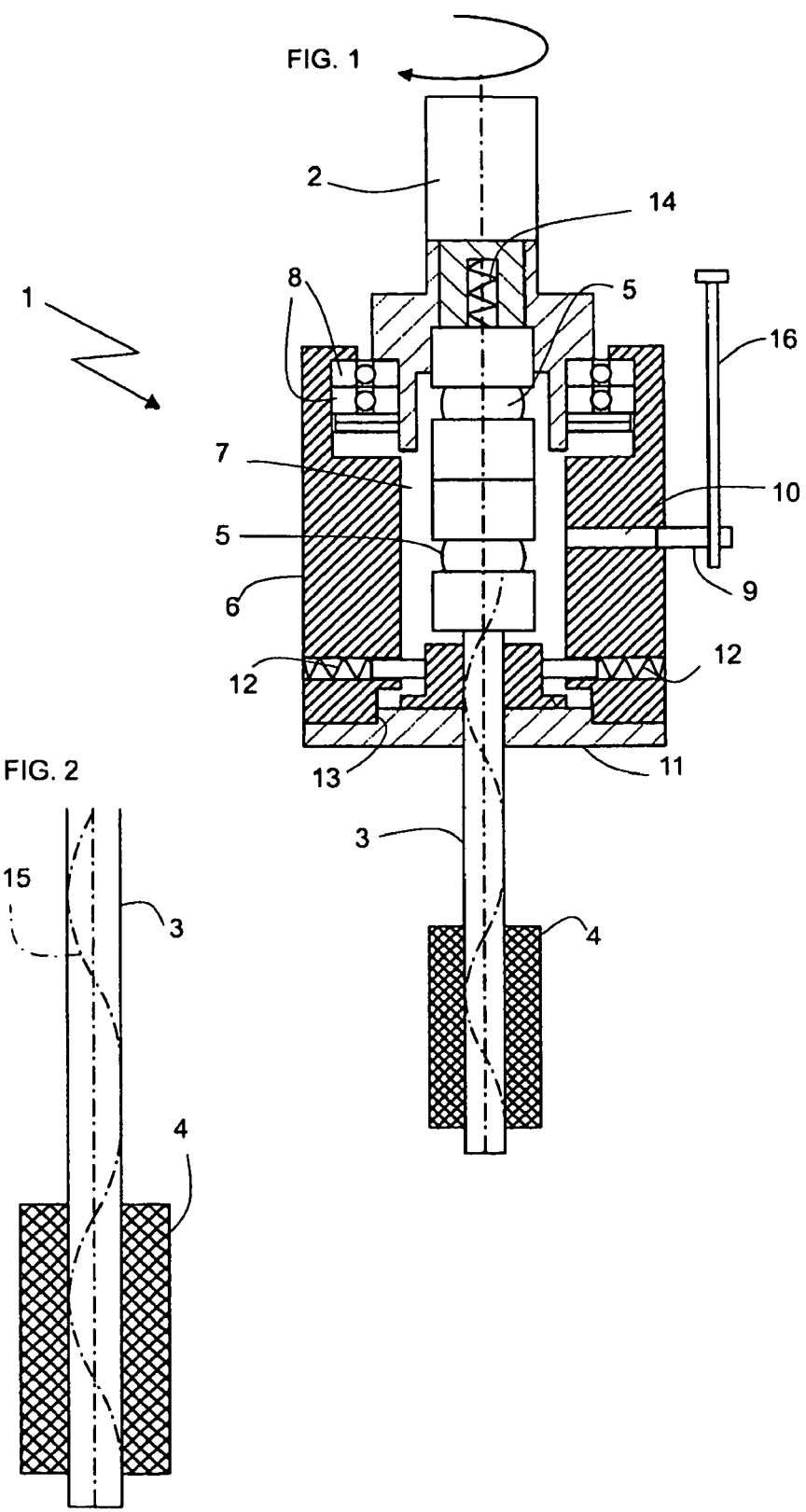

TOOL-HOLDING SYSTEM FOR HIGH-ACCURACY CALIBRATION OF HOLES

Object of the present invention is a tool-holding system for high-accuracy calibrating through-holes and non-through-holes.

This system, as for example a spindle does, must perform the function of rotating a high-accuracy calibrating tool placed on a driven shaft in a misaligned position with respect to a driving shaft of the system itself Due to the above-mentioned misalignment of the driving shaft with respect to the drive shaft, two cardan joints must be inserted between said shafts.

As known, the insertion of cardan joints generates on the driven shaft transverse oscillating forces that are unacceptable for the type of working.

In fact, the present invention refers to those types of systems with various connections adapted to carry tools used for workings such as calibration and lapping or vertical holes, that imply reaching a micrometric accuracy degree on the order of a dimensional tolerance width equal to or included between IT1 and IT5 according to ISO system and geometric tolerances on the order of 2 μm of cylindricity and 1 μm of roundness and a surface roughness less than 0.2 Ra (approximate).

The above workings refer to processes for removing ferrous materials and not through abrasion.

In the following description the term "spindle" will be used for generically referring to any tool-holding system.

Through vertical-axis spindles with cardan joints currently known on the market, the required accuracy degree is not able to be reached due to vibrations induced both by working and by the cardan junction between the two shafts.

Moreover, resonance phenomena occur, that are triggered due to external forces, such as, for example, vibrations to which the spindle is subjected due to the driving motor; these are forced vibrations due to periodic thrusts.

Another great disturbance phenomenon is due to the precession motion, namely to the motion of a cylindrical body rotating around its own generatrix that continuously change its angle, with respect to a vertical line, due to the angular moment operating on the body (a typical example of precession motion being the one of a top whose-rotation axis is initially slanted with respect to the vertical).

In order to reduce the oscillation amplitude, an external cylindrical body or liner has been inserted, constrained through ball bearings to the driving shaft.

The cylindrical body is locked in its rotation by an external constraint secured to the fixed structure of the spindle-holding machine, while its vertical axial dragging is allowed with the driving shaft.

By inserting the external cylindrical body or liner, the oscillation amplitude has been reduced, but not in such a way as to comply with the above-required tolerances.

Object of the present invention is removing the above-mentioned inconveniences by providing a tool-holding system that is able to reach the above-required finishing degrees and in particular to reach radial movement values of the driven shaft equal to ±1–1.5 mm and axial movement values equal to ±10–15 degrees.

Only with the above-mentioned movement values a high-accuracy calibration with blocked workpiece can be reached.

These and other objects are fully reached by the tool-holding system for high-accuracy calibration of the present invention, that is characterised by the contents of the below-mentioned claims and in particular in that it comprises, in combination, a cylindrical body or liner wrapped around the joints and creating a chamber in which lubrication and cooling oil is kept, this chamber being closed on its bottom side by a driving bush oscillating in a plane perpendicular to the tool rotation axis. Compensation means for radial and axial oscillations of the tool-holding driven shaft are provided.

This and other features will be better pointed out by the following description of two preferred embodiments shown, as a purely non-limiting example, in the enclosed drawings, in which:

FIG. 1 shows the tool-holding system in a longitudinal section and according to a first embodiment;

FIG. 2 shows part of the driven shaft with the diagram of oscillations whose amplitude is contained within said driven shaft diameter;

Figure 3:
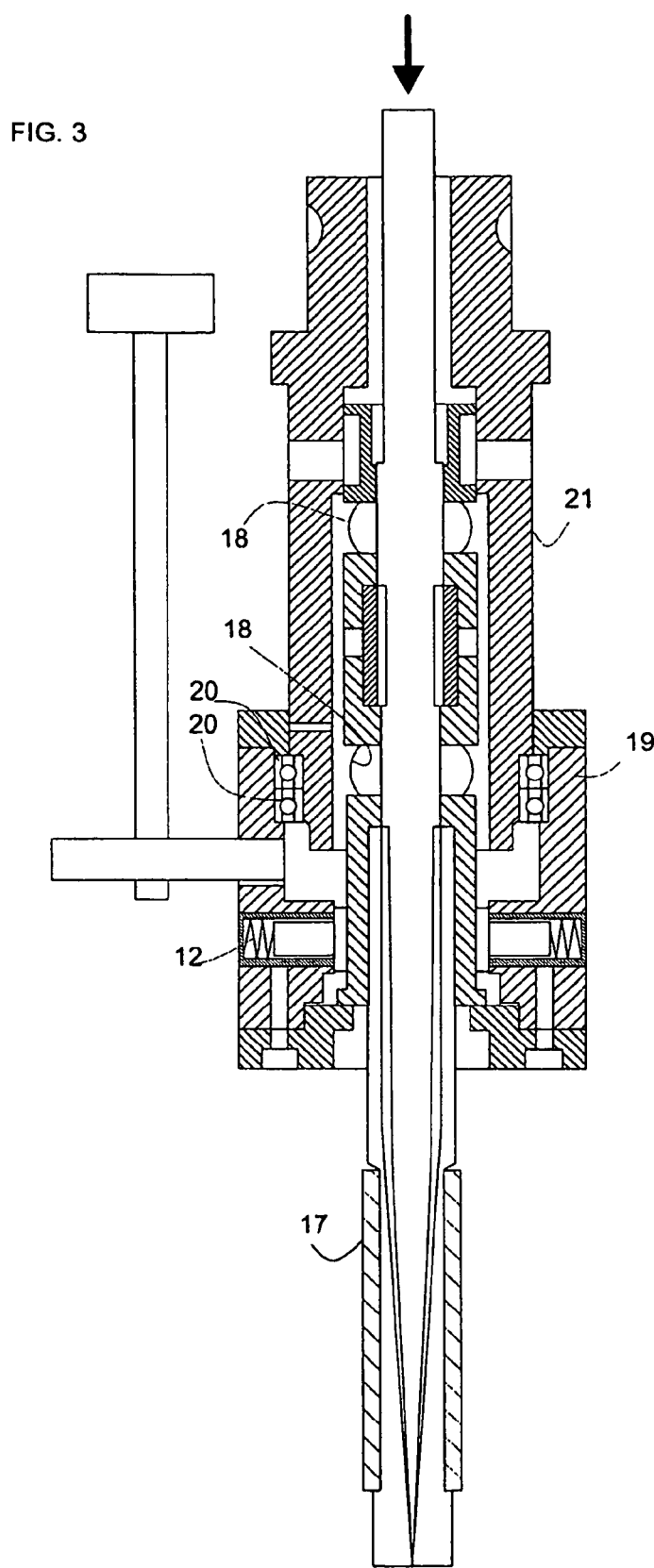
FIG. 3 shows the tool-holding system in a longitudinal section and according to a second embodiment.

With reference to FIG. 1, reference 1 globally refers to a spindle body as a whole that provides for a driving shaft 2 and a driven shaft 3 on which, according to known techniques, a tool 4 is assembled that is composed, as an example, of an abrasive bush with different grain grades (for example a diamond bush or a boron nitride bush).

Generally the driven shaft can rotate along both directions. The driving shaft is connected to the driven shaft through two cardan joints 5.

Reference 6 shows another external cylindrical body or liner that is wrapped around the whole area occupied by the two cardan joints creating an annular chamber 7.

The cylindrical body 6 is connected and supported by the driving shaft through two bearings 8 and its rotation is prevented through a pipe 9 that is engaged into an hole 10 that communicates with the annular chamber 7.

Pipe 9, that is used to continuously supply lubrication and cooling oil to chamber 7, is kept secured to the machine structure, not shown, through a lock rod 16.

Cylindrical body 6 is closed on its bottom side by a driving sliding bush 11 that is housed in a cylindrical body recess 13.

The driven shaft driving bush is compensated by a plurality of springs 12 that exert radial elastic thrusts onto said bush.

More precisely the driving bush 11 is free of moving on the orthogonal plane to the tool rotation axis, but is kept in position, in the above-described embodiment, by four springs 12 which can be calibrated according to needs.

All cardan joints and driven shaft assembly can then radially float and oscillations are compensated by radial compensating means composed of the four springs.

Axial compensating means are also provided vertically and are composed of a further helical spring 14 placed over the upper cardan joint.

Function of oil in chamber 7, in addition of operating for lubrifying and cooling all moving members, is hydraulically dampening the oscillating movements.

As can be noted from FIG. 2, with the above-described tool-holding system, it has been possible to greatly reduce the oscillation amplitudes, shown by curve 15, that are, contained within the driven shaft diameter.

With reference to FIG. 3, in case an expansion tool 17 is assembled on driven shaft 3, a supplementary double cardan joint 18 is also provided, as an articulation instrument, placed along the central spindle body and coaxial with driven shaft 3 that carries the tool, in order to guarantee the correct oscillation dampening.

This solution, technically equivalent to the previous one, provides for a stabilising cylindrical body 19 that carries the four springs 12 exerting radial thrusts. The stabilising cylindrical body, kept fixed, is supported by a rotating cylindrical body or liner 21 through the two bearings 20.

Obviously numerous modifications and variations could be provided, all falling within the scope of the claims below, such as for example the number of springs can be different from the described one, as well as elastic thrusts can also be exerted by other means such as small blocks made of rubber or other synthetic elastic material or compressed-air cylinders, etc.

The type of used springs could be different, such as for example Belleville washers or other types of springs.

With the above-described tool-holding system, numerous advantages are obtained, in addition to the one of reaching a finishing and accuracy degree that was not able to be reached previously with cardan joint spindles, such as for example:

it is possible to make blind holes too;
    reduction of tooling times and costs;
    correct balancing neutralization for moving masses to be worked;
    reduced length encumbrances with respect to the vertical working axis.

The invention claimed is:

1. An improved tool-holding system including a driving shaft connected through first and second cardan joints to a driven shaft carrying a tool, the improvement comprising: an external cylindrical body surrounding the cardan joints and creating a chamber between the cardan joints and the body, the chamber being closed on a bottom side by a driving bush of the driven shaft, the driving bush being substantially adjacent an end of the driven shaft connected to the second cardan joint and oscillating in a plane perpendicular to a rotation axis of said driven shaft, said chamber being supplied by lubricating and cooling oil; elastic means for compensating radial oscillations of the driven shaft adapted to keep the driving bush in position; axial compensating means adapted to compensate vertical movements of the driven shaft.

2. Tool-holding system according to claim 1 further comprising at least one bearing keyed onto the driving shaft and supporting the cylindrical body, the cylindrical body being retained against rotation while the driving shaft rotates.

3. Tool-holding system according to claim 1 characterised in that the radial compensating elastic means comprises a plurality of springs uniformly radially arranged about the cylindrical body thickness and engaging the driving bush.

4. Tool-holding system according to claim 1 characterised in that the axial compensating means comprises a spring placed between driven shaft and driving shaft.

5. Tool-holding system according to claim 1 characterised in that both axial compensating means and radial compensating means are adjustable to allow the compensating means to be calibrated.

6. Tool-holding system according to claim 1 further comprising an oil supply pipe into the chamber that is also a rotation-locking member for the cylindrical body.

7. Tool-holding system according to claim 1 characterised in that the radial compensating means, the axial compensating means, and oil in chamber cooperate to limit an amplitude of an oscillation of the driven shaft within the driven shaft diameter.

8. A tool-holding system comprising:
    a drive shaft connected to a driven shaft via first and second cardan joints, the driven shaft being axially movable relative to the drive shaft and supporting and driving a tool;
    a substantially cylindrical body substantially coaxial with axes of rotation of the drive shaft, driven shaft, and the first and second cardan joints;
    the substantially cylindrical body surrounding the cardan joints and being held against rotation;
    an annular chamber surrounding the cardan joints between the cardan joints and the substantially cylindrical body;
    a bush at a lower end of the substantially cylindrical body covering the lower end adjacent a juncture of the second cardan joint and the driven shaft and movable in a plane transverse to a longitudinal axis of the substantially cylindrical body;
    at least one bush elastic member, a first end of each of the at least one bush elastic member engaging the bush and a second end of each of the at least one bush elastic member engaging the substantially cylindrical body, thereby retaining the bush substantially coaxial with the substantially cylindrical body while allowing some movement in the plane and damping vibration in the plane; and
    at least one axial elastic member between the drive shaft and driven shaft and arranged to dampen axial movement of the drive shaft.

9. The tool-holding system of claim 8 wherein the at least one bush elastic member comprises a plurality of radially-arranged coil springs.

10. The tool-holding system of claim 8 wherein the at least one axial elastic member comprises a spring in an end of the drive shaft closest to the driven shaft.

11. The tool-holding system of claim 10 wherein a first end of the spring engages the end of the drive shaft and a second end of the spring engages one of the cardan joints.

12. The tool-holding system of claim 8 further comprising an oil supply hole through which oil can enter the annular chamber, the oil lubricating, cooling, and dampening vibration of the elements within the substantially cylindrical body.

13. The tool-holding system of claim 12 further comprising a locking rod insertable into the oil supply hole that retains the substantially cylindrical body against rotation.

* * * * *

UNITED STATES PATENT AND TRADEMARK OFFICE
CERTIFICATE OF CORRECTION

| | | |
|---|---|---|
| PATENT NO. | : 7,134,818 B2 | Page 1 of 1 |
| APPLICATION NO. | : 10/483841 | |
| DATED | : November 14, 2006 | |
| INVENTOR(S) | : Franco Mazzá | |

It is certified that error appears in the above-identified patent and that said Letters Patent is hereby corrected as shown below:

On The Title Page, Item (73)

The Assignee is incorrectly listed as "Sumen Italia S.R.L. (IT)."

The Assignee should be listed as --Sunnen Italia S.R.L. (IT).--

Signed and Sealed this

Fifth Day of June, 2007

JON W. DUDAS
*Director of the United States Patent and Trademark Office*